United States Patent
McRobert et al.

(10) Patent No.: US 6,728,793 B1
(45) Date of Patent: Apr. 27, 2004

(54) SYSTEM MANAGEMENT BUS ADDRESS RESOLUTION PROTOCOL PROXY DEVICE

(75) Inventors: Stephen McRobert, Sunnyvale, CA (US); Robert Alan Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 625 days.

(21) Appl. No.: 09/629,925

(22) Filed: Jul. 31, 2000

Related U.S. Application Data

(60) Provisional application No. 60/217,484, filed on Jul. 11, 2000.

(51) Int. Cl.⁷ .............................................. G06F 13/00
(52) U.S. Cl ............................ 710/8; 710/62; 710/104; 379/88.12
(58) Field of Search .................... 710/8, 62, 104; 379/88.12

(56) References Cited

U.S. PATENT DOCUMENTS

| | | | | |
|---|---|---|---|---|
| 6,009,479 A | * | 12/1999 | Jeffries | 710/8 |
| 6,173,350 B1 | * | 1/2001 | Hudson et al. | 710/126 |
| 6,336,152 B1 | * | 1/2002 | Richman et al. | 710/8 |
| 6,498,835 B1 | * | 12/2002 | Skaldman et al. | 379/88.12 |
| 6,526,464 B1 | * | 2/2003 | Jobs et al. | 710/100 |
| 6,629,172 B1 | * | 9/2003 | Anderson et al. | 710/104 |

OTHER PUBLICATIONS

Smart battery System Specifications, "System Management Bus Specification", Revision 1.1, Dec. 11, 1998.

* cited by examiner

*Primary Examiner*—Abdelmoniem Elamin
(74) *Attorney, Agent, or Firm*—Manelli Denison & Selter PLLC; Leon R. Turkevich

(57) ABSTRACT

A proxy device such as a microcontroller, coupled to the SMBus, is configured for obtaining, according to the SMBus Address Resolution Protocol (ARP) and from an Address Resolution Protocol (ARP) master, an SMBus slave address for an SMBus device. The proxy device also is configured for outputting the obtained SMBus slave address for storage by the SMBus device independent of the ARP protocol. Hence, the proxy agent enables SMBus slave addresses to be assigned in SMBus devices that lack the ability to receive an assigned SMBus address according to the SMBus ARP.

19 Claims, 2 Drawing Sheets

SYSTEM MANAGEMENT BUS ADDRESS RESOLUTION PROTOCOL PROXY DEVICE

This application claims priority from Provisional Application No. 60/217,484, filed Jul. 11, 2000.

FIELD OF THE INVENTION

The present invention relates to management of System Management Bus (SMBus) devices using an SMBus Address Resolution Protocol.

BACKGROUND ART

Some newer personal computers include system management devices connected to a System Management Bus (SMBus) and configured for monitoring system parameters. These system management devices are configured for communication on a System Management Bus (SMBus) according to the System Management Bus Specification, Version 1.1, developed by the Smart Battery System (SBS) Implementers Forum. In particular, the SMBus is a two-wire multi-master bus, where more than one device capable of controlling the bus can be connected. The two-wire SMBus, based on the I2C Bus, is typically used for power supply monitoring and management, for example during recharging of rechargeable batteries in portable equipment such as laptop PCs. The SMBus uses an arbitration mechanism based on the I2C and relying on the wired-AND (e.g., open drain) connection of all SMBus devices: if two or more devices attempt to output data on the SMBus, any device outputting a "1" loses to any other device outputting a "0".

A Draft Version 2.0 of the SMBus Specification describes an SMBus Address Resolution Protocol (ARP) that allows an SMBus ARP master device to assign 7-bit SMBus slave addresses to all SMBus slave devices having the capability of participating in the ARP process. An ARP-capable device must support six types of ARP commands and must provide storage for a 128 bit unique device identifier (UDID). Hence, the extra logic and data storage space required to modify a conventional SMBus device into an ARP-capable device may be substantial, adding cost and complexity to a device which may result in an unacceptably high extension to the development time.

SUMMARY OF THE INVENTION

There is a need for an arrangement that enables SMBus slave addresses to be assigned according to the SMBus Address Resolution Protocol to SMBus devices lacking ARP logic.

There also is a need for an arrangement that enables the use of legacy SMBus devices (i.e., SMBus devices lacking ARP capabilities) on an SMBus controlled by an ARP master device configured for assigning slave addresses to the SMBus devices.

These and other needs are attained by the present invention, where a proxy agent, coupled to the SMBus, is configured for obtaining, according to the SMBus Address Resolution Protocol (ARP) and from an Address Resolution Protocol (ARP) master, an SMBus slave address for a SMBus device. The proxy agent also is configured for outputting the obtained SMBus slave address for storage by the SMBus device independent of the ARP protocol. Hence, the proxy agent enables SMBus slave addresses to be assigned in SMBus devices that lack the ability to receive an assigned SMBus address according to the SMBus ARP.

One aspect of the present invention provides a method for supplying a System Management Bus (SMBus) slave address to an SMBus device coupled to an SMBus. The method includes receiving the SMBus slave address by a proxy device, coupled to the SMBus, according to an SMBus Address Resolution Protocol (ARP) from an ARP master, and supplying the SMBus slave address from the proxy device to the SMBus device independent of the Address Resolution Protocol. The reception of the SMBus slave address by the proxy device enables the proxy device to arbitrate for the SMBus slave addresses on behalf of the SMBus device lacking the capability of performing ARP operations. Moreover, the supply of the SMBus slave address by the proxy device to the SMBus device, independent of the ARP, enables the proxy device to provide SMBus slave addresses to SMBus devices lacking ARP capabilities, with minimal or no modification to the SMBus devices.

Another aspect of the present invention provides a system configured for communication on a System Management Bus with an Address Resolution Protocol (ARP) master configured for providing SMBus slave addresses to ARP-capable SMBus devices. The system includes an ARP-capable proxy device having a memory configured for storing unique device identifiers and respective SMBus slave addresses obtained from the ARP master based on a match between received ARP master commands including respective matching unique device identifiers. The system also includes at least one SMBus device configured for loading an SMBus slave address supplied by the ARP-capable proxy device.

An additional feature of this aspect is that the at least one SMBus device is configured for loading the SMBus slave address from the SMBus in response to a corresponding enable signal. In particular, the ARP-capable proxy device is configured for asserting the corresponding enable signal and outputting the corresponding SMBus slave address on the SMBus in response to storage thereof in the memory of the ARP-capable proxy device. The addition of the enable signal facilities the assignment of the slave addresses by a proxy agent to an SMBus device which is not, by itself, ARP capable.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
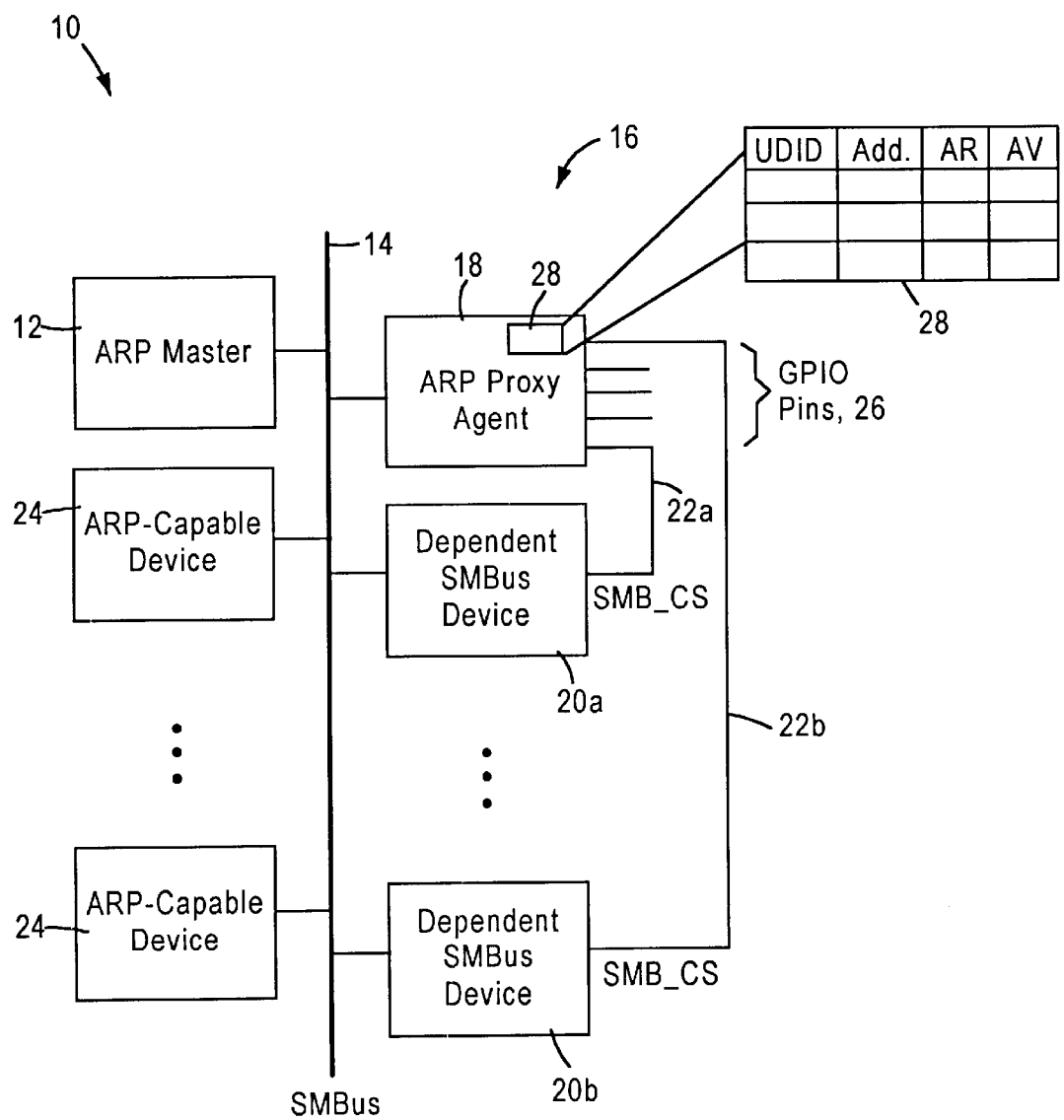
FIG. 1 is a block diagram illustrating an SMBus system having an SMBus Address Resolution Protocol Master and a proxy device configured for obtaining SMBus addresses for SMBus devices lacking ARP capabilities according to an embodiment of the present invention.

FIG. 1 is a block diagram of an SMBus system 10 having an Address Resolution Protocol (ARP) master device 12, a two-wire System Management Bus (SMBus) 14, and a proxy system 16 configured for retrieval of the SMBus slave addresses according to an embodiment of the present invention. The proxy system 16 includes an ARP-capable proxy device 18 and at least one dependent SMBus device 20 configured for receiving an SMBus slave address from the proxy device 18 in response to a corresponding chip select signal (SMB_CS) 22.

As shown in FIG. 1, the proxy device 18 is configured for arbitrating with other ARP-capable devices 24 for assignment of 7-bit SMBus slave addresses. In particular, the ARP-capable devices 24 are configured for supporting six types of ARP commands, and must provide storage for a 128 bit unique device identifier (UDID). As described below, however, the dependent SMBus devices 20 are configured for learning a new slave addresses from the slave address field of a prescribed command, for example a Quick Command, in response to assertion of the corresponding chip select signal 22. Hence, the dependent SMBus devices 20 can be configured for programming of the SMBus slave addresses, without the relative expense associated with the ARP capable devices 24.

The proxy device 18, implemented for example using a microcontroller, has a group of general-purpose I/O (GPIO) pins 26, wherein each GPIO pin 26 is configured for outputting the corresponding enable signal 22 to the corresponding dependent SMBus device 20. Hence, each dependent SMBus device 20 has a corresponding pin for reception of the corresponding enable signal 22. Deassertion of the enable signal 22 disables the SMBus logic in the corresponding dependent SMBus device 20, preventing the corresponding dependent SMBus device 20 from issuing commands as an SMBus master or responding as a slave to SMBus commands on the SMBus 14. In contrast, assertion of the enable signal 22 causes the dependent device 20 to load the slave address field of the next message into its address register. The enable signal 22 remains asserted, and the dependent device 20 responds to messages whose slave address field matches the contents of the address register. Hence, the SMB_CS 22 signal is used to load the address register, and to enable the device 20. In particular, the 0 to 1 transition on the SMB_CS signal 22 sets an internal hardware flag that causes the dependent device 20 to load its address register with the contents of the slave address field of the next message on the bus. Hence, the dependent device 20 remains enabled as long as the SMB_CS signal 22 is asserted. Once the SMB_CS signal 22 is deasserted, the device 20 no longer responds to the SMBus 14.

If there is a collision while the proxy device 18 is attempting to load the address register of the dependent device 20, the wrong address will be loaded into the address register; as described below, however, this problem is resolved based on the proxy device 18 detecting the collision and deasserting the enable signal 22, such that the dependent device 20 no longer responds to the SMBus 14.

The proxy device 18 has a memory 28 configured for storing 128-bit unique device identifiers (UDIDs) and 7-bit SMBus slave addresses for the respective dependent SMBus devices 20. The memory 28 also is configured for storing an Address Resolved (AR) flag and an Address Valid (AV) flag, in accordance with the SMBus specification, Version 2.0, for each of the dependent SMBus devices 20. In most applications the proxy device 18 would need to have its own separate SMBus Address and UDID; hence, the memory 28 would be configured for storing the UDID, SMBus Address, Address Resolved flag and Address Valid flag for the proxy device 18, and each of the dependent SMBus devices 20.

The proxy device 18 is configured for performing ARP-based commands on behalf of itself and the dependent SMBus devices 20 in accordance with the SMBus specification, Version 2.0. For example, if the proxy device 18 detects a Get UDID command (General), the proxy device 18 responds first with the highest UDID value in accordance with the bit-by-bit arbitration. Similarly, if the proxy device 18 detects a Reset Device (General) or a Reset Device (Directed) command that is directed to the proxy device 18 or one of the dependent devices 20, the proxy device 18 clears the appropriate AR flag within the memory 28. Clearing of the AR flag for one or more of the dependent devices 20 also causes the proxy device 18 to deassert the corresponding enable signal(s) 22 to prevent the corresponding dependent device(s) 20 from responding to SMBus messages.

Figure 2:
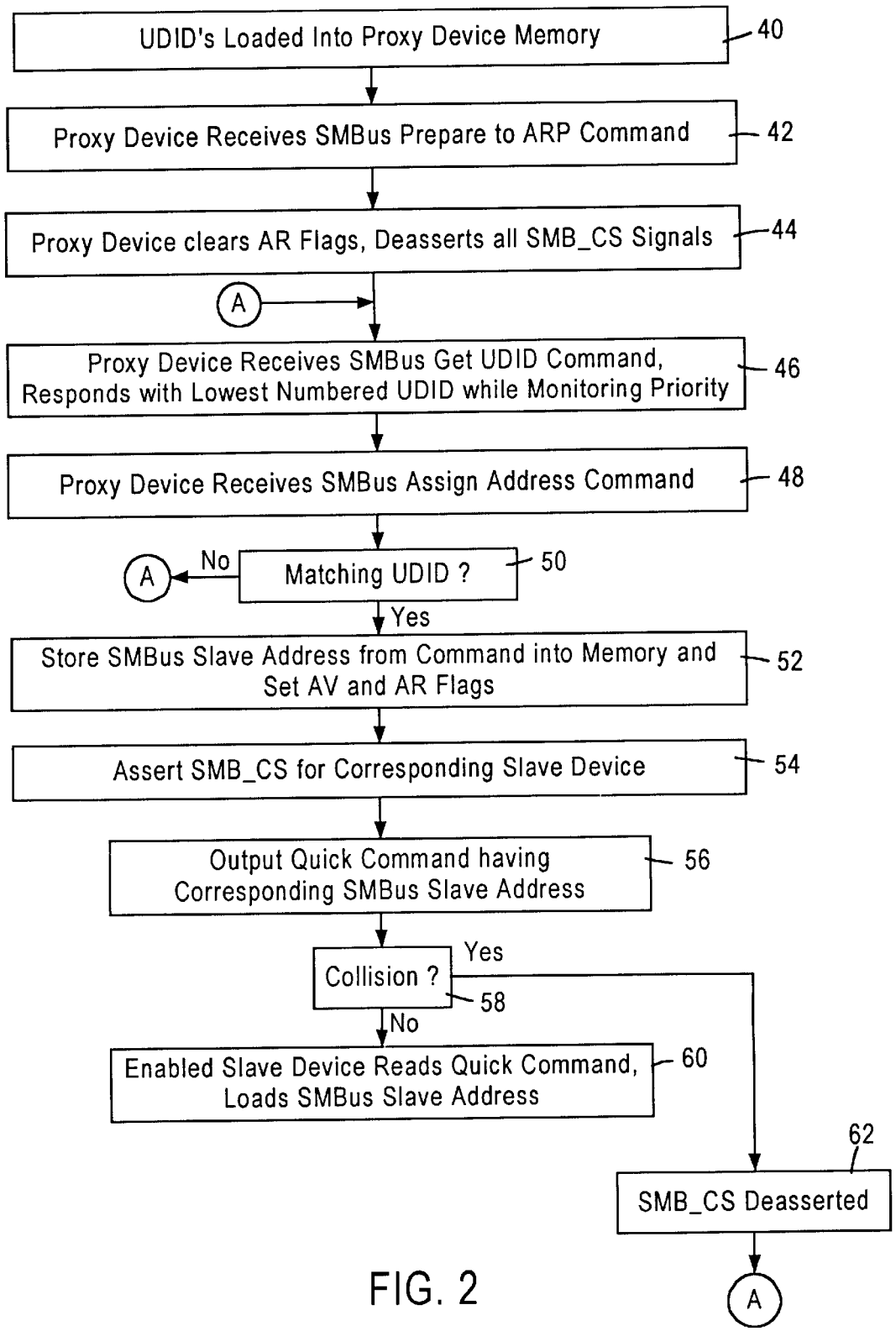
FIG. 2 is a diagram illustrating the method of supplying an SMBus slave address to an SMBus device by the proxy device according to another embodiment of the present invention.

FIG. 2 is a diagram illustrating the method of providing slave addresses to the dependent SMBus devices 20 by the proxy device 18 according to an embodiment of the present invention. The method begins in step 40, wherein the 128 bit UDID values for the dependent SMBus devices 20 are loaded into the proxy device memory 28, for example by a configuration program executed by a system central processing unit. Once the 128 bit UDID values are loaded into the proxy device memory 28, the proxy device 18 can begin to perform ARP mediation on behalf of the dependent SMBus devices 20. The proxy device 18 deasserts all the enable signals 22 to prevent the respective dependent SMBus devices 20 from responding to SMBus messages during the ARP process or before an address has been assigned to the dependent SMBus devices 20 after a reset.

The ARP master device 12 begins the ARP process by outputting onto the SMBus 14 a Prepare to ARP command. Each of the ARP capable devices, such as the proxy device 18 and the ARP-capable devices 24, prepare for the Address Resolution Protocol in response to receiving the Prepare to ARP command. In particular, the proxy device 18, upon receiving the Prepare to ARP command in step 42, clears the AR flags and deasserts all the chip select (SMB_CS) enable signals 22 in step 44.

The ARP master 12 then begins the mediation between the ARP capable devices 18 and 24 by outputting an SMBus Get UDID command onto the SMBus 14. In response to receiving the SMBus Get UDID command, the proxy device 18 in step 46 accesses the lowest numbered UDID from the memory 28, and outputs the accessed UDID onto the SMBus 14 while monitoring the priority of addresses by other devices. In particular, the proxy device 18 monitors the open collector SMBus 14 to determine whether the signal on the SMBus 14 matches the UDID address output by the proxy device 18; if the address on the SMBus 14 does not match the UDID address output by the proxy device 18, the proxy device 18 stops transmitting the UDID address.

Following the output of the respective UDID addresses by the devices 18 and 24 onto the SMBus 14, the master 12 detects the UDID address supplied on the SMBus 14 and outputs an SMBus Assign Address Command that specifies the UDID address specified on the SMBus 14 and an assigned SMBus slave address. The proxy device 18 receives in step 48 the SMBus Assign Address Command, and determines in step 50 whether the UDID in the SMBus Assign Address Command matches one of the UDID addresses stored in the memory 28: if there is no match, then the proxy device 18 ignores the SMBus command; however, if there is a matching UDID, the proxy device 18 stores in step 52 the SMBus slave address from the SMBus Assign Address Command into the corresponding memory location for the matching UDID in the memory 28, and sets the corresponding AV and AR flags.

In response to storage of the SMBus slave address in the memory 28, the proxy device 18 asserts in step 54 the chip select enable signal (e.g., 22*a*) for the corresponding SMBus slave device (e.g., 20*a*), to enable the selected SMBus slave device to respond to a Quick Command output by the proxy device 18. In particular, the proxy device 18 outputs in step 56 a Quick Command that includes the corresponding SMBus slave address, while monitoring the SMBus 14 to determine whether there is a collision with another device on the SMBus 14. If in step 58 the proxy device 18 detects a collision, then the proxy agent 18 deasserts the enable signal 22 for the selected SMBus device 20 in step 62 and waits until the SMBus 14 is quiet before attempting to repeat steps 54 and 56 to retransmit the Quick Command.

However if no collision is detected in step 58, the proxy device 18 maintains the enable signal 22 for the selected device 20, enabling the selected device 20 to read the quick command and load the specified SMBus slave address in step 60. The proxy device 18 then maintains the enable signal 22 until the device is reset, a Reset Device command is issued, or a Prepare to ARP command is issued.

The proxy device 18 can continue the ARP process for the remaining SMBus devices 20, after which the ARP proxy device 18 selectively asserts another one of the enable signals 22 for the dependent SMBus devices 20 to operate according to the SMBus specifications, until all the enable signals 22 are asserted at the end of the arbitration until the devices are reset by a Reset Device command or a Prepare to ARP command.

As apparent from the foregoing, actual implementation of the microcontroller program for the proxy agent 18 would involve a flag for each dependent device that indicates Address Load Pending. These flags would be checked in the main loop so that when the SMBus is idle, the proxy device 18 would continue to attempt writing the appropriate quick command until it is successful. However if the proxy device 18 loses the arbitration to the ARP master, it must respond to the master's command if appropriate.

According to the disclosed embodiment, a proxy device 18 enables SMBus devices lacking ARP capabilities to effectively become ARP capable without the necessity of the relatively complex ARP logic circuitry or the necessity of a 128 bit register for storage of the UDID. Hence, the SMBus Address resolution protocol can be implemented using an SMBus device having a cost that is less than a comparable ARP-capable device.

Further, the addition of the enable signal facilitates the assignment of the slave addresses by a proxy agent to an SMBus device which is not, by itself, ARP capable. However, other mechanisms may be used to program the slave addresses by the proxy into the non-ARP capable SMBus device. For example, the ARP proxy could access the register interface of the non-ARP capable SMBus device which is normally used by the system microprocessor.

While this invention has been described with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for supplying a System Management Bus (SMBus) slave address to an SMBus device coupled to an SMBus, the method comprising:

receiving the SMBus slave address by a proxy device, coupled to the SMBus, according to an SMBus Address Resolution Protocol (ARP) from an ARP master; and supplying the SMBus slave address from the proxy device to the SMBus device independent of the Address Resolution Protocol.

2. The method of claim 1, further comprising:

receiving by the proxy device a unique device identifier for the SMBus device;

storing the unique device identifier a memory internal to the proxy device; and storing the SMBus slave address corresponding to the unique device identifier in the memory, the proxy device receiving the SMBus slave address based on the corresponding unique device identifier.

3. The method of claim 2, wherein the SMBus has a second SMBus device, the method further comprising:

receiving a second SMBus slave address by the proxy device from the ARP master according to the SMBus Address Resolution Protocol (ARP); and supplying the second SMBus slave address from the proxy device to the second SMBus device independent of the Address Resolution Protocol.

4. The method of claim 3, further comprising:

receiving by the proxy device a second unique device identifier for the second SMBus device;

storing the second unique device identifier in the memory; and storing the second SMBus slave address in the memory, the proxy device receiving the second SMBus slave address based on the corresponding second unique device identifier.

5. The method of claim 4, wherein the step of supplying the SMBus slave address and the second SMBus slave address each comprise:

outputting the corresponding SMBus slave address onto the SMBus; and asserting a chip select signal for the corresponding SMBus device.

6. The method of claim 1, wherein the supplying step includes selecting the SMBus device for reception of the SMBus slave address from a plurality of the SMBus devices coupled to the SMBus.

7. The method of claim 6, wherein the selecting step includes asserting a chip select signal to the selected SMBus device.

8. The method of claim 1, wherein the supplying step includes:

asserting a chip select signal to the SMBus device; and outputting onto the SMBus a Quick command that includes the SMBus slave address during assertion of the chip select signal.

9. The method of claim 8, wherein the proxy device is a microcontroller having general purpose I/O (GPIO) pins, the asserting step including generating the chip select signal on a selected one of the GPIO pins.

10. The method of claim 8, further comprising asserting the chip select signal to the SMBus device for activation of the SMBus device in performing an operation with the SMBus.

11. The method of claim 1, wherein the supplying step includes:

detecting a collision by the proxy device on the SMBus during a first attempted transmission of the SMBus slave address to the SMBus device; and outputting a second attempted transmission by the proxy device of the SMBus slave address to the SMBus device in response to the detected collision and based on a detected idle condition on the SMBus.

12. The method of claim 11, wherein the supplying step further includes:

first asserting a chip select signal to the SMBus device for the first attempted transmission of the SMBus slave address;

deasserting the chip select signal in response to the detected collision; and second asserting the chip select signal to the SMBus device for the second attempted transmission of the SMBus slave address.

13. The method of claim 1, the proxy device includes a memory configured for storing, the method further comprising storing the received SMBus slave address in the memory in response to detection of an SMBus assign address command having a supplied unique device identifier matching one of the stored unique device identifiers.

14. The method of claim 13, wherein the supplying step includes supplying an enable signal to the SMBus device based on storage of the corresponding SMBus slave address, for storage by the SMBus slave address of the supplied SMBus slave address.

15. A system configured for communication on a System Management Bus with an Address Resolution Protocol (ARP) master configured for providing SMBus slave addresses to ARP-capable SMBus devices, the system including:

an ARP-capable proxy device having a memory configured for storing unique device identifiers and respective SMBus slave addresses obtained from the ARP master based on a match between received ARP master commands including respective matching unique device identifiers; and at least one SMBus device configured for loading an SMBus slave address supplied by the ARP-capable proxy device.

16. The system of claim 15, wherein the at least one SMBus device loads the SMBus slave address from the SMBus in response to a corresponding enable signal, the ARP-capable proxy device configured for asserting the corresponding enable signal and outputting the corresponding SMBus slave address on the SMBus in response to storage thereof in the memory.

17. The system of claim 16, wherein the at least one SMBus device includes logic for performing and disabling SMBus access operations in response to assertion and deassertion of the corresponding enable signal.

18. The system of claim 17, wherein the SMBus device loads the SMBus slave address in response to assertion of the enable signal and a Quick command carrying the SMBus slave address and output by the ARP-capable proxy device.

19. The system of claim 16, further comprising a plurality of the SMBus devices coupled to the SMBus and configured for SMBus operations in response to the corresponding enable signal, the ARP-capable proxy device implemented as a microcontroller having general purpose I/O (GPIO) pins, each GPIO pin configured for outputting the corresponding enable signal to a corresponding one of the SMBus devices.

* * * * *